(12) United States Patent
Manthena et al.

(10) Patent No.: US 11,632,389 B2
(45) Date of Patent: *Apr. 18, 2023

(54) CONTENT-BASED OPTIMIZATION AND PRE-FETCHING MECHANISM FOR SECURITY ANALYSIS ON A NETWORK DEVICE

(71) Applicant: Juniper Networks, Inc., Sunnyvale, CA (US)

(72) Inventors: Venkata Rama Raju Manthena, San Ramon, CA (US); Chandrasekar Nagarajan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/731,299

(22) Filed: Dec. 31, 2019

(65) Prior Publication Data

US 2020/0153853 A1 May 14, 2020

Related U.S. Application Data

(63) Continuation of application No. 15/472,535, filed on Mar. 29, 2017, now Pat. No. 10,554,684.

(51) Int. Cl.
*G06F 21/00* (2013.01)
*H04L 29/06* (2006.01)
(Continued)

(52) U.S. Cl.
CPC ........ *H04L 63/1441* (2013.01); *G06F 16/258* (2019.01); *G06F 16/285* (2019.01);
(Continued)

(58) Field of Classification Search
CPC .... G06F 16/258; G06F 16/285; G06F 21/552; H04L 63/1441
See application file for complete search history.

(56) References Cited

U.S. PATENT DOCUMENTS 8,607,066 B1 12/2013 Kailash et al.
9,680,866 B2 * 6/2017 Baddour ............... G06F 16/951
(Continued)

FOREIGN PATENT DOCUMENTS

CN 1759396 A 4/2006
CN 102195878 A 9/2011
(Continued)

OTHER PUBLICATIONS

Anonymous, "Web Accelerator—Wikipedia," Dec. 9, 2016, [Retrieved from the Internet: https://en.wikipedia.org/w/index.php?title=Webaccelerator&oldid=753753981, retrieved on May 24, 2018], pp. 1-3. XP055478116.

(Continued)

*Primary Examiner* — Philip J Chea
*Assistant Examiner* — Rodman Alexander Mahmoudi
(74) *Attorney, Agent, or Firm* — Harrity & Harrity, LLP

(57) ABSTRACT

A first device may receive content from a second device based on a request for the content. The first device may be located between the second device and a third device. The first device may determine a value for a portion of the content using a function, where the value is to be used to analyze the content. The value may uniquely identify the portion of the content. The first device may determine whether a classification of the content can be determined. The first device may selectively determine the classification of the content by providing the value or the portion of the content corresponding to the value, to a fourth device when the classification cannot be determined, or determine the classification of the content using a data store when the classification can be determined. The first device may perform an action with respect to the content.

20 Claims, 11 Drawing Sheets

(51) Int. Cl.
  *H04L 9/40*      (2022.01)
  *G06F 16/25*     (2019.01)
  *G06F 16/28*     (2019.01)
  *G06F 16/901*    (2019.01)
  *G06F 21/55*     (2013.01)
  *G06F 21/56*     (2013.01)
  *H04L 67/5681*   (2022.01)
  *G06F 21/60*     (2013.01)
  *H04L 9/06*      (2006.01)
  *G06F 16/957*    (2019.01)

(52) U.S. Cl.
  CPC ........ *G06F 16/9017* (2019.01); *G06F 21/552* (2013.01); *G06F 21/564* (2013.01); *G06F 21/602* (2013.01); *H04L 9/0643* (2013.01); *H04L 63/1425* (2013.01); *H04L 67/5681* (2022.05); *G06F 16/9574* (2019.01)

(56) References Cited

U.S. PATENT DOCUMENTS

| | | | |
|---|---|---|---|
| 9,866,479 | B2 | 1/2018 | Wang et al. |
| 9,886,508 | B2* | 2/2018 | Harris .................. G06F 16/951 |
| 2004/0181687 | A1 | 9/2004 | Nachenberg et al. |
| 2006/0218126 | A1 | 9/2006 | De Ruijter et al. |
| 2007/0006293 | A1* | 1/2007 | Balakrishnan ........ H04L 63/145 726/13 |
| 2007/0240218 | A1 | 10/2007 | Tuvell et al. |
| 2011/0258702 | A1 | 10/2011 | Olney et al. |
| 2012/0259882 | A1 | 10/2012 | Thakur et al. |
| 2013/0139247 | A1 | 5/2013 | Cianfrocca |
| 2014/0254379 | A1* | 9/2014 | Sampath .............. H04N 21/643 370/235 |
| 2015/0227979 | A1 | 8/2015 | Greenzeiger et al. |
| 2017/0255681 | A1* | 9/2017 | Giunio-Zorkin .... G06F 16/9574 |
| 2017/0261615 | A1* | 9/2017 | Ying ....................... H04K 3/90 |
| 2018/0032599 | A1* | 2/2018 | Larsen ................. G06F 16/285 |
| 2018/0288089 | A1 | 10/2018 | Manthena et al. |

FOREIGN PATENT DOCUMENTS

| | | |
|---|---|---|
| CN | 103632069 A | 3/2014 |
| CN | 102197664 B | 7/2014 |
| CN | 105897589 A | 8/2016 |

OTHER PUBLICATIONS

Extended European Search Report for Application No. EP17204789, dated Jun. 4, 2018, 9 pages.

Wikipedia, "Hash Function," https://en.wikipedia.org/wiki/Hash_function, Mar. 24, 2017, 12 pages.

Wikipedia, "Web Accelerator," https://en.wikipedia.org/w/index.php?title=Webaccelerator&oldid=753753981, May 24, 2018 (print date), 3 pages.

* cited by examiner

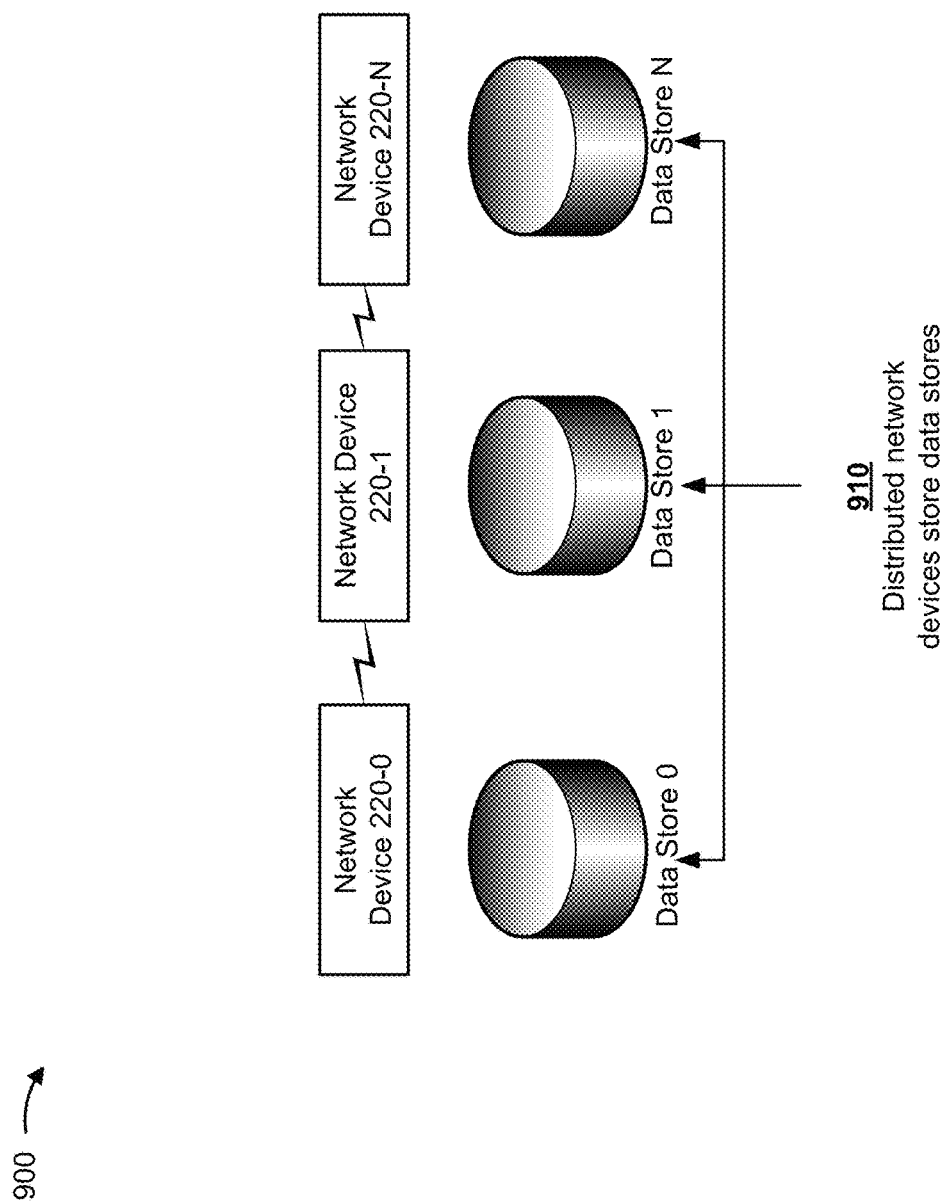

CONTENT-BASED OPTIMIZATION AND PRE-FETCHING MECHANISM FOR SECURITY ANALYSIS ON A NETWORK DEVICE

RELATED APPLICATION

This application is a continuation of U.S. patent application Ser. No. 15/472,535, filed Mar. 29, 2017, which is incorporated herein by reference.

BACKGROUND

Malware (i.e., malicious software) may refer to any software used to disrupt the operations of a computer or mobile device. This may include gathering sensitive information, gaining access to private computer systems, and/or displaying unwanted advertising. Malware may include viruses, worms, Trojan horses, adware, spyware, keyboard loggers, phishing, and/or the like.

SUMMARY

According to some possible implementations, a first device may include one or more processors to receive content from a second device based on a request for the content. The request may be from a third device. The one or more processors may determine a value for a portion of the content using a hash function based on receiving the content from the second device. The value may uniquely identify the portion of the content. The one or more processors may determine whether a classification of the content can be determined by performing a lookup of the value in a data store based on determining the value for the portion of the content. The classification may be associated with an action that the first device is to perform with respect to the content. The one or more processors may selectively determine the classification of the content by providing the value, or the portion of the content corresponding to the value, to a fourth device to permit the fourth device to determine the classification of the content based on determining that the classification of the content cannot be determined by performing the lookup, or determine the classification of the content based on determining that the classification of the content can be determined by performing the lookup. The one or more processors may perform the action with respect to the content based on the classification of the content after determining the classification.

According to some possible implementations, a non-transitory computer-readable medium may store one or more instructions that, when executed by one or more processors, cause the one or more processors to receive content from one or more server devices based on one or more requests for the content. The one or more requests may be from one or more client devices. The one or more requests may include information associated with at least one of the one or more client devices, the one or more server devices, or the content being requested. The one or more instructions, when executed by the one or more processors, may cause the one or more processors to determine one or more values for one or more portions of the content based on receiving the content from the one or more server devices, where the one or more values are to be used to identify one or more classifications of the content. The one or more instructions, when executed by the one or more processors, may cause the one or more processors to determine whether the one or more classifications of the content can be determined based on the one or more values for the one or more portions of the content. The one or more classifications may indicate whether the content is potentially harmful to the one or more client devices. The one or more instructions, when executed by the one or more processors, may cause the one or more processors to selectively determine the one or more classifications of the content when the one or more classifications of the content can be determined based on the one or more values for the one or more portions of the content, or determine the one or more classifications of the content by providing the one or more values, or the one or more portions of the content corresponding to the one or more values, to one or more security analysis devices when the one or more classifications of the content cannot be determined based on the one or more values for the one or more portions of the content. The one or more instructions, when executed by the one or more processors, may cause the one or more processors to perform one or more actions based on the one or more classifications of the content after determining the one or more classifications.

According to some possible implementations, a method may include receiving, by a first device, content from multiple second devices based on multiple requests for the content. The first device may be located between the multiple second devices and multiple third devices providing the multiple requests. The method may include determining, by the first device, multiple values for multiple portions of the content using a function based on receiving the content from the multiple second devices, where the multiple values are to be used to analyze the content. The multiple values may uniquely identify the multiple portions of the content. The method may include determining, by the first device, whether multiple classifications of the content can be determined based on the multiple values for the multiple portions of the content. The method may include selectively determining, by the first device, the multiple classifications of the content by providing the multiple values, or the multiple portions of the content corresponding to the multiple values, to one or more fourth devices when the multiple classifications of the content cannot be determined, or determining, by the first device, the multiple classifications of the content using a data store when the multiple classifications of the content can be determined. The method may include performing, by the first device, multiple actions with respect to the content based on the multiple classifications of the content after determining the multiple classifications.

BRIEF DESCRIPTION OF THE DRAWINGS

FIG. 9 is a diagram of an example implementation relating to the example process shown in FIG. 4.

DETAILED DESCRIPTION

The following detailed description of example implementations refers to the accompanying drawings. The same reference numbers in different drawings may identify the same or similar elements.

As threats from harmful content increase, a network device performing security functions has to process an increasing amount of content to determine whether the content is harmful. This may cause latency with respect to providing the content to a destination. In addition, the network device may have to provide the content to another device for processing, thereby consuming significant network resources (e.g., bandwidth) and reducing performance of a network.

Implementations described herein enable a network device to determine a classification of content in association with performing security functions by determining a value (e.g., a digest) for the content and using the value to determine the classification. In addition, implementations described herein enable optimization of use of multiple values for various sized portions of content to reduce a quantity of values determined for the content. In this way, the network device reduces an amount of content that needs to be processed by the network device to determine a classification of the content, thereby conserving processing resources and reducing latency. Furthermore, in this way, the network device reduces an amount of information that may have to be sent to a security analysis device for processing (e.g., when the network device fails to determine the classification of the content), thereby conserving network resources and improving network performance. Further still, in this way, the implementations optimize network resources related to providing content to an external security analysis device when a value for full, or partial, content has been previously classified. Further still, in this way, the implementations provide a mechanism to prevent security evasion based on, for example, hypertext transfer protocol (HTTP) content range header techniques.

Figure 1A:
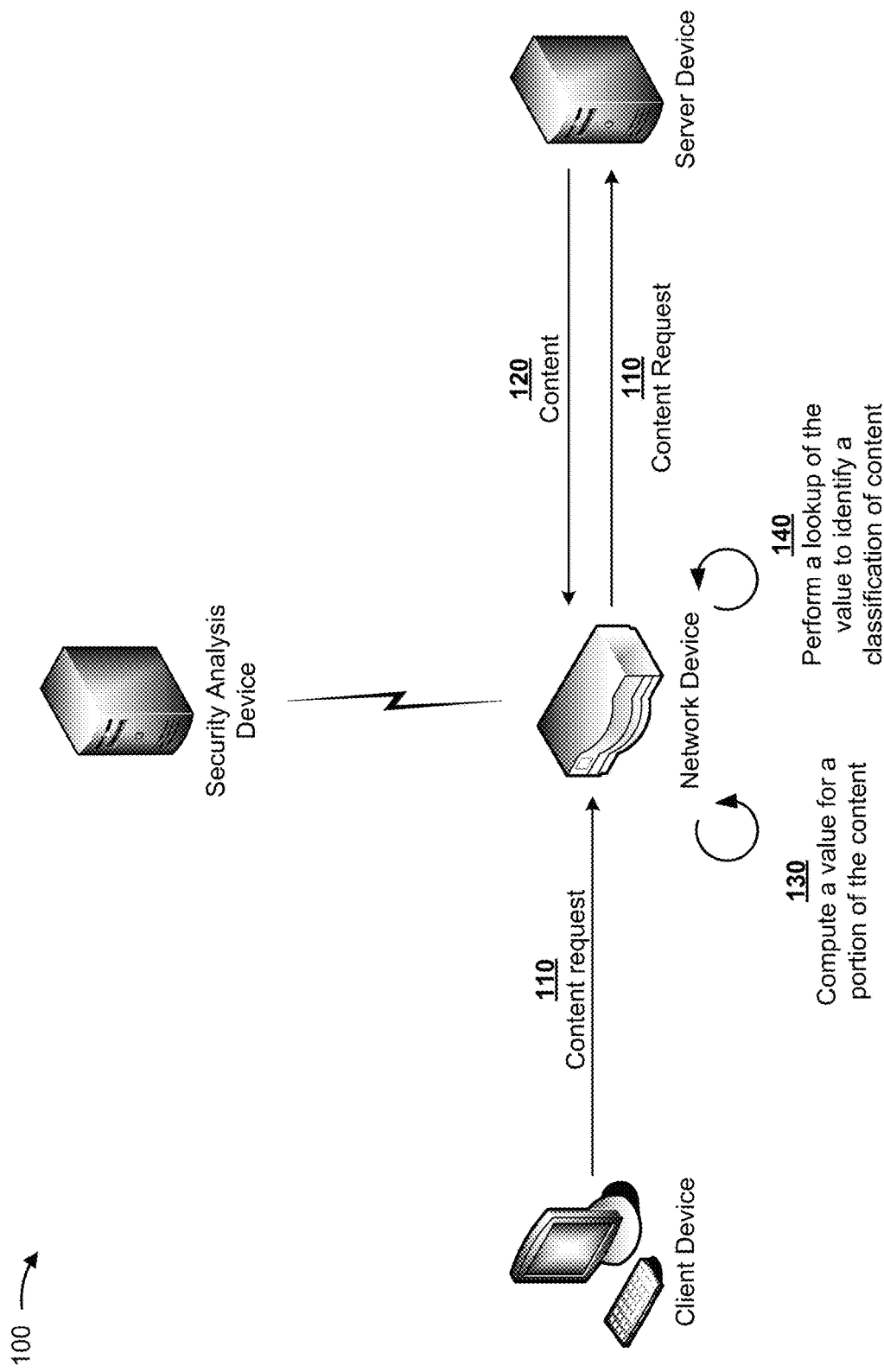
FIGS. 1A and 1B are diagrams of an overview of an example implementation described herein.
Figure 1B:
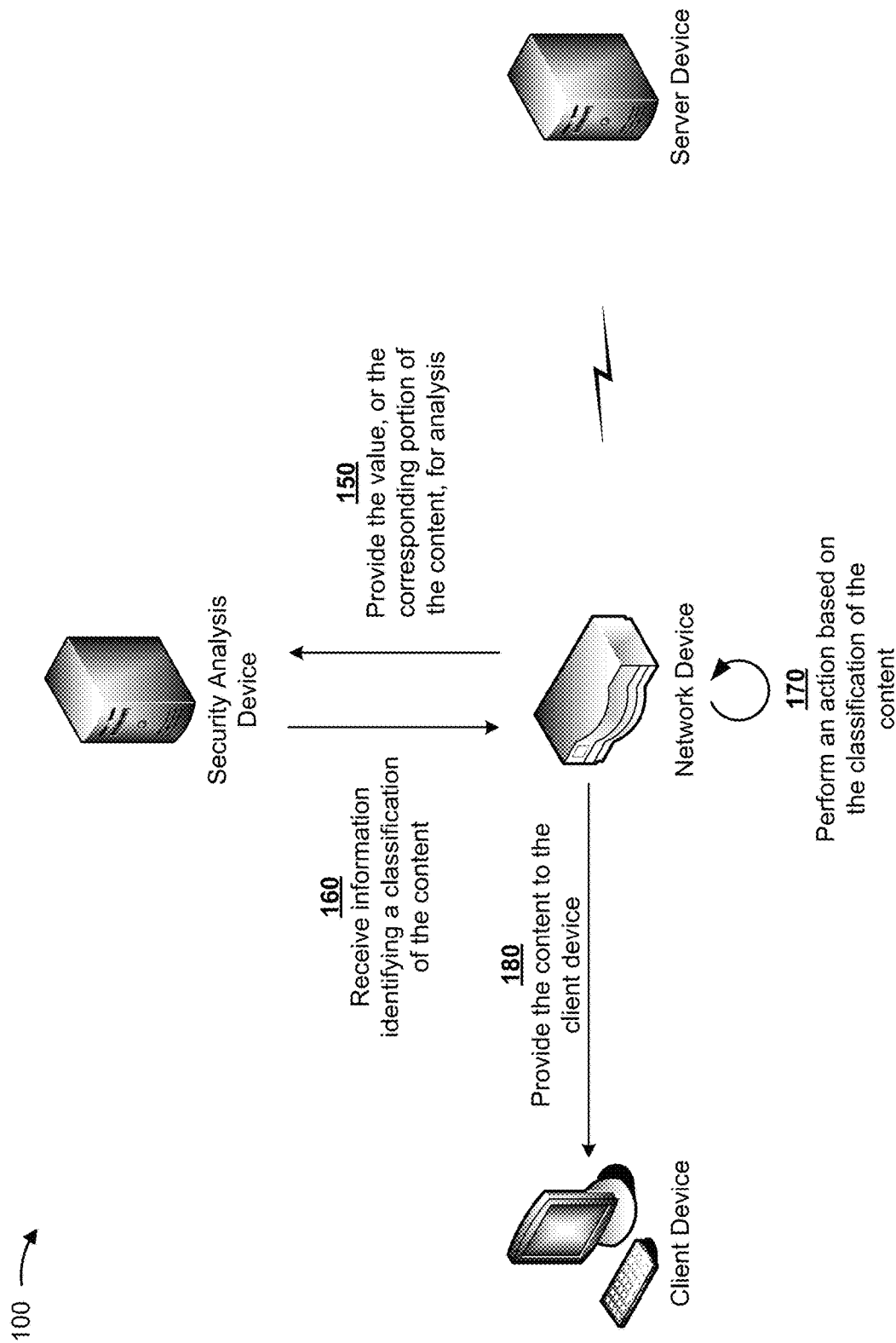

FIGS. 1A and 1B are diagrams of an overview of an example implementation 100 described herein. As shown in FIGS. 1A and 1B, example implementation 100 may include a client device that obtains content from a server device via a network device. The network device may provide information associated with the content to a security analysis device for analysis of the information. Some implementations may include a service (e.g., a public or private service), provided by a device, that can perform analysis of content, or a value of the content, and provide a classification of the content (e.g., rather than a security analysis device). The network device may compute values (e.g., digests) based on the content, and may determine a classification of the content based on the values. In some implementations, the network device may determine a classification of the content based on processing the content and/or based on information from the security analysis device determined via processing of content that the security analysis device is performing in real-time or that the security analysis device has performed previously.

As shown in FIG. 1A, and by reference numbers 110, the network device may receive a request for content from the client device, and may provide the request to the server device. In this case, the network device may apply a rule with respect to the request based on information included in the request. For example, the network device may block the request or may permit the request to be sent to the server device, such as based on information included in the request that identifies a source of the request, a destination of the request, the content being requested, and/or the like.

As shown by reference number 120, the network device may receive content from the server device. For example, the server device may process the request, and may provide the requested content to the network device.

As shown by reference number 130, the network device may compute a value for a portion of the content. For example, the network device may compute a value for the content using a hash function. Continuing with the previous example, the network device may compute a value for a one kilobyte (KB) portion of the content, a value for a 10 KB portion, a value for a 100 KB portion, a value for a one megabyte (MB) portion, and so forth.

The network device may determine multiple values for the content. For example, the network device may determine a value for a one KB portion, and may attempt to determine a classification for the content using the one KB portion (as described below) prior to determining a value for a 10 KB portion. Continuing with the previous example, the network device may avoid determining the value for the 10 KB portion if the network device successfully determines the classification for the content based on the value determined for the one KB portion. This conserves processing resources of the network device by reducing a quantity of values that the network device has to determine when identifying a classification for the content and optimizes security analysis via use of values for smaller portions of the content.

As shown by reference number 140, the network device may perform a lookup of the value to identify a classification of the content (e.g., phishing, adware, etc.). For example, the network device may perform the lookup using a data store of the network device or of another network device. In some implementations, the data store may be located on the network device, or closer to the network device relative to other devices, thereby reducing latency and increasing efficiency related to obtaining information from the data store. If the network device successfully identifies the classification of the content, then the network device may perform an action related to the content, as described in more detail below. Conversely, if the network device cannot successfully identify the classification of the content, then the network device may determine to provide the value to a security analysis device (e.g., to cause the security analysis device to attempt to determine the classification of the content based on the value).

As shown in FIG. 1B, and by reference number 150, the network device may provide the value, or the corresponding portion of content, to a security analysis device to permit the security analysis device to process the value and/or the portion of content. For example, the network device may provide the value, or the portion of content, based on failing to identify the classification using the data store.

The network device may first provide the value to the security analysis device, such as when providing the value consumes fewer network resources relative to providing the portion of content. The network device may provide the portion of content after providing the value if the security analysis device fails to identify the classification of the content using the value. This conserves network resources by reducing an amount of information (e.g., content or a value determined for the content) provided to the security analysis device.

In some cases, if the security analysis device unsuccessfully identifies the classification using the portion of the content, then the network device may determine another value for another portion of the content. In other words, example implementation 100 may include returning to reference number 130. For example, the network device may determine a value for a portion that is larger than the portion associated with the previously determined value. Continuing with the previous example, the network device may determine a value for a 10 KB portion, when the originally determined value was for a one KB portion. In this way, the network device optimizes determining a classification of the content by using values for increasingly larger portions of the content to determine a classification of the content.

This conserves network resources by reducing an amount of information provided to the security analysis device. In addition, this conserves processing resources of the network device and the security analysis device by reducing an amount of information provided by the network device, received by the security analysis device, and/or processed by the security analysis device. For example, the network device may not have to provide information and/or content to the security analysis device, such as when the information and/or content has previously been provided to the security analysis device, when a classification can be determined based on a portion of the content (e.g., eliminating a need to provide the entire content), and/or the like. This further conserves network resources, such as network bandwidth, and/or permits the network device to wait before providing information and/or content to the security analysis device, thereby conserving processing resource of the network device.

The security analysis device may process a received value and/or a corresponding portion of the content to determine a classification. For example, the security analysis device may perform a lookup of the value or the portion of content, inspect the portion of content, and/or the like.

As shown by reference number 160, the network device may receive information identifying a classification of the content from the security analysis device. For example, the network device may receive information from the security analysis device identifying the content as malware, adware, spyware, good-ware, permitted content, and/or the like. Additionally, or alternatively, the network device may receive a set of instructions from the security analysis device to, for example, perform additional security services depending on the classification of the content, such as an intrusion prevention service, to perform additional authentication, to implement captcha, and/or the like.

As shown by reference number 170, the network device may perform an action based on the classification of the content. For example, if the content is classified as malware, the network device may drop the content and may not provide the content to the client device. As another example, the network device may permit the content if the content is not classified as malware, is classified as a particular type of permitted content, and/or the like.

As shown by reference number 180, the network device may provide the content to the client device based on the classification of the content. For example, the network device may provide the content based on the content not being classified as malware. As another example, the network device may provide the content based on the content being classified as permitted content.

In this way, the network device reduces an amount of information (e.g., content or a value determined for the content) to be processed by the network device to determine a classification of the content, thereby conserving processing resources and reducing latency. Furthermore, in this way, the network device reduces an amount of information that may have to be provided to a security analysis device for processing, thereby conserving network resources and improving network performance.

As indicated above, FIGS. 1A and 1B are provided merely as an example. Other examples are possible and may differ from what was described with regard to FIGS. 1A and 1B.

Figure 2:
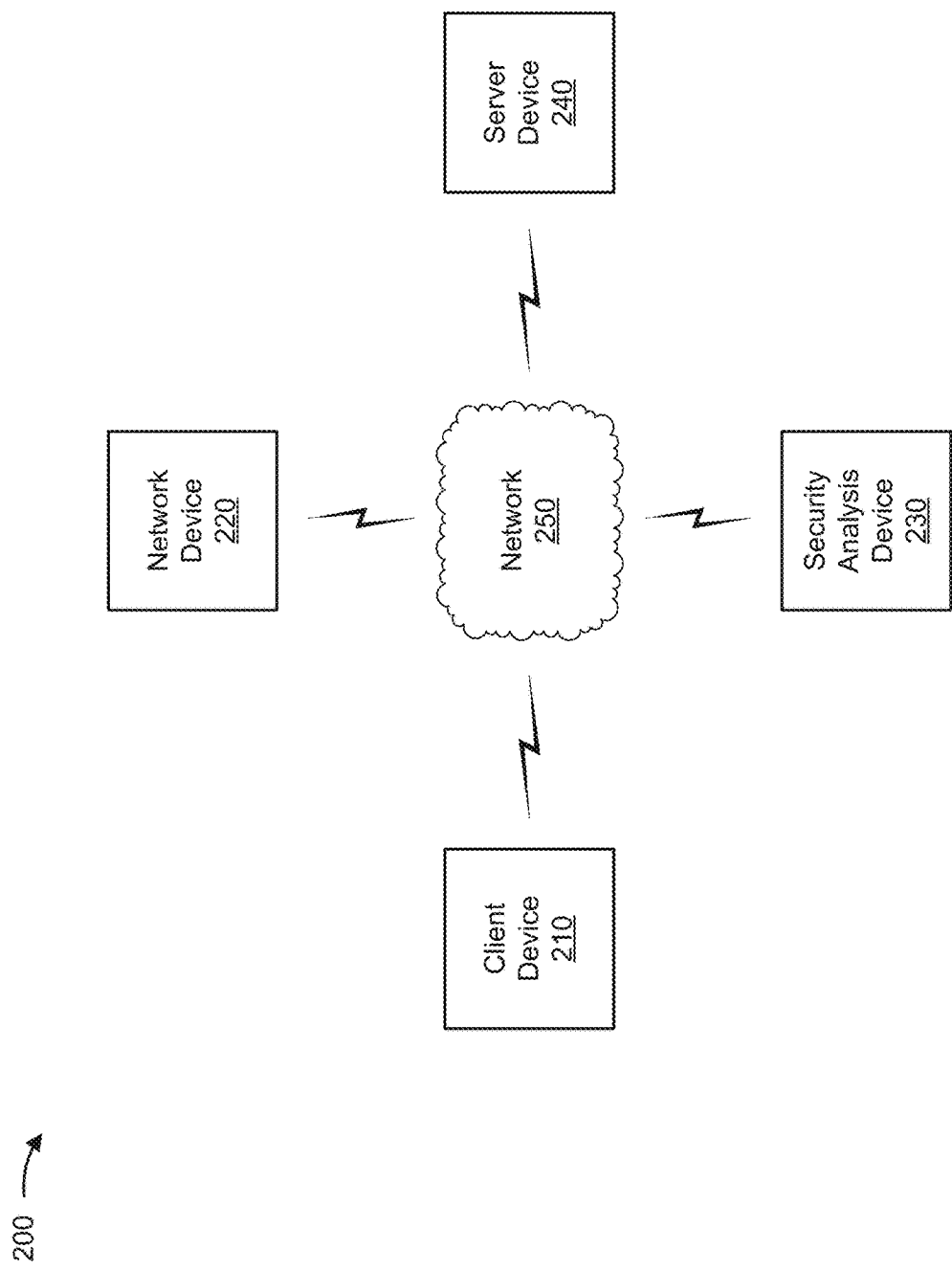
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network device 220, a security analysis device 230, a server device 240, and a network 250. Devices of environment 200 may interconnect via wired connections, wireless connections, or a combination of wired and wireless connections.

Client device 210 includes one or more devices capable of receiving, generating, storing, processing, and/or providing information associated with a request for content. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may provide a request for content to server device 240 via network device 220, as described elsewhere herein. Additionally, or alternatively, client device 210 may receive the requested content from server device 240 via network device 220, as described elsewhere herein.

Network device 220 includes one or more devices (e.g., one or more traffic transfer devices) capable of receiving, generating, storing, processing, and/or providing traffic between client device 210 and/or server device 240. For example, network device 220 may include a firewall, a router, a gateway, a switch, a hub, a bridge, a reverse proxy, a server (e.g., a proxy server), a security device, an intrusion detection device, a load balancer, or a similar type of device. In some implementations, network device 220 may receive content requested by client device 210, as described elsewhere herein. Additionally, or alternatively, network device 220 may process the content to identify a classification of the content, as described elsewhere herein. In some implementations, network device 220 may act as a gateway to a private network that includes one or more client devices 210. In some implementations, multiple network devices 220 may operate together as a gateway to a private network that includes one or more client devices 210.

Security analysis device 230 includes one or more devices capable of receiving, generating, storing, processing, and/or providing information associated with a request for content. For example, security analysis device 230 may include an analysis engine, a security device, an intrusion detection device, a firewall, a router, a gateway, a switch, a hub, a bridge, a reverse proxy, a server (e.g., a proxy server), a load balancer, or a similar type of device. In some implementations, security analysis device 230 may receive content (e.g., requested by client device 210) and/or information related to the requested content, as described elsewhere herein. Additionally, or alternatively, security analysis device 230 may identify a classification of the content, as described elsewhere herein.

Server device 240 includes one or more devices capable of receiving, generating, storing, processing and/or providing information associated with a request for content. For example, server device 240 may include a server (e.g., a web server, a server in a multi-server data center, or the like), a workstation computer, a virtual machine (VM) provided in a cloud computing environment, or a similar type of device. In some implementations, server device 240 may receive a request for content stored by server device 240, as described elsewhere herein. Additionally, or alternatively, server device 240 may provide the requested content based on receiving the request, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
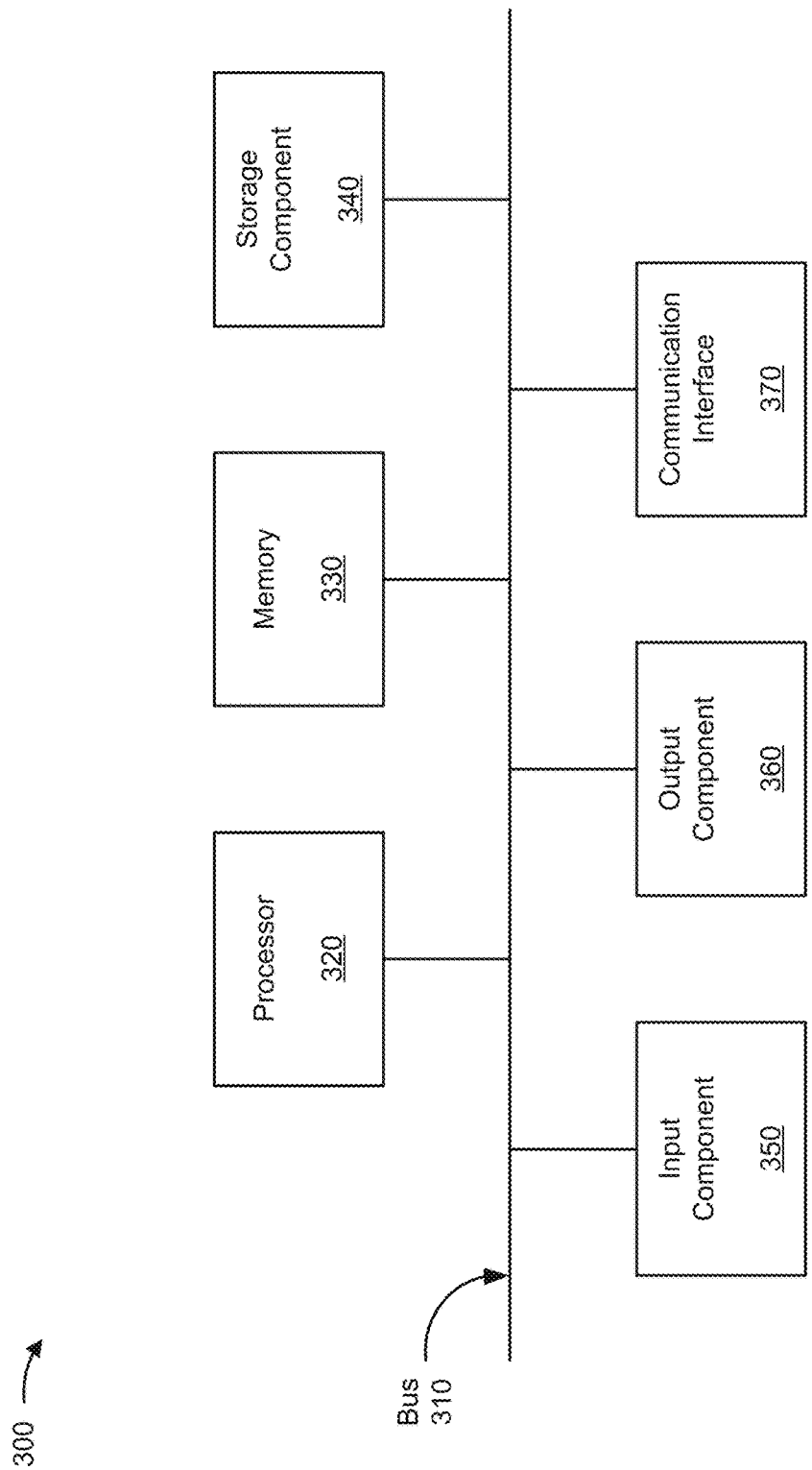
FIG. 3 is a diagram of example components of one or more devices of FIG. 2.

FIG. 3 is a diagram of example components of a device 300. Device 300 may correspond to client device 210, network device 220, security analysis device 230, and/or server device 240. In some implementations, client device 210, network device 220, security analysis device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
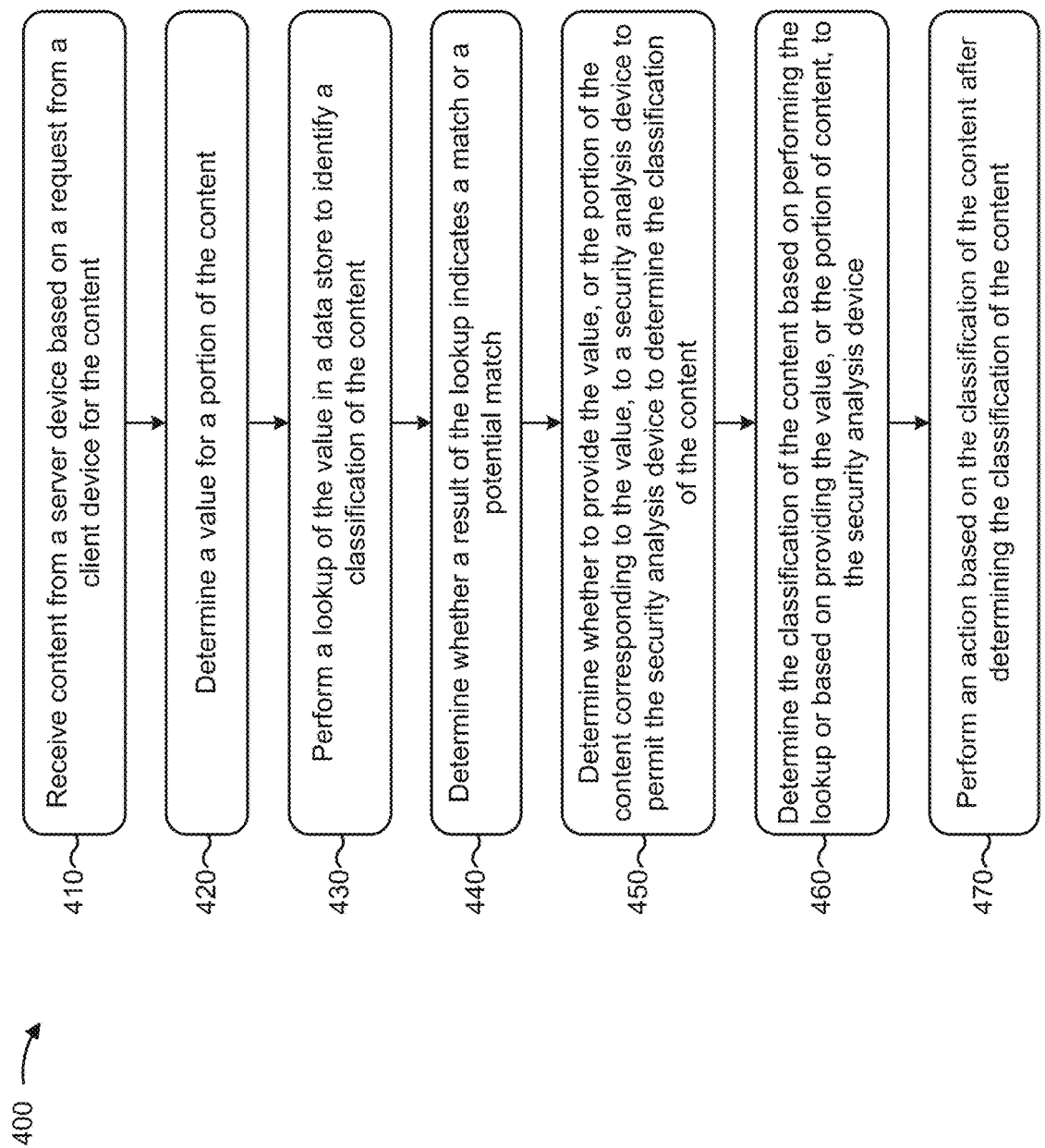
FIG. 4 is a flow chart of an example process for optimizing security analysis on a network device.

FIG. 4 is a flow chart of an example process 400 for optimizing security analysis on a network device. In some implementations, one or more process blocks of FIG. 4 may be performed by network device 220. In some implementations, one or more process blocks of FIG. 4 may be performed by another device or a group of devices separate from or including network device 220, such as client device 210, security analysis device 230, and server device 240.

As shown in FIG. 4, process 400 may include receiving content from a server device based on a request from a client device for the content (block 410). For example, network device 220 may receive content from server device 240. In some implementations, network device 220 may receive the content based on a request from client device 210 for the content.

In some implementations, content may include an executable file, a document, an application file, a package, a script, web-content, text data, video data, audio data, and/or the like. In some implementations, a request may include a particular type of request. For example, the request may include a Hypertext Transfer Protocol (HTTP) request.

In some implementations, the request may include information associated with the request. For example, the request may include a uniform resource identifier (URI), such as a uniform resource locator (URL) or a uniform resource name (URN) of the content, an HTTP cookie (e.g., a web cookie, an Internet cookie, a browser cookie, etc.), and/or the like. Additionally, or alternatively, the request may include information identifying a particular portion of the content being requested (e.g., a chunk, a range of bytes, a time range for audio and/or video data, etc.). For example, the request may include starting and ending identifiers of a set of contiguous bytes of data, beginning and end times for audio/video data, and/or the like. Additionally, or alternatively, the request may include information identifying a source of the request and/or a destination of the content, such as a source address, a source port, a destination address, or a destination port. Additionally, or alternatively, for an email message, the request may include information identifying a sender, a recipient, a subject, a body of the email message, rich content related to the email message, a header, a link included in the email mail message, and/or the like.

In some implementations, network device 220 may receive encrypted content. For example, network device 220 may receive encrypted content from a Hypertext Transfer Protocol Secure (HTTPS) website. In some implementations, network device 220 may use a decryption technique to decrypt the content when network device 220 receives the content. In some implementations, network device 220 may use a set of Transport Layer Security (TLS) and/or Secure Sockets Layer (SSL) protocols to decrypt the content. For example, network device 220 may use a set of TLS and/or SSL protocols to identify data in multi-level encapsulation and/or encryption.

In some implementations, network device 220 may determine whether the content includes personal information or other sensitive information. For example, personal information or other sensitive information may include information identifying a name and/or address of an individual, an identifier that identifies an individual (e.g., a telephone number or a social security number), bank account information, a particular type of information (e.g., even if not traceable directly to a particular individual), such as aggregated medical data, and/or the like. In some implementations, network device 220 may identify the content as including personal information or other sensitive information by parsing the content to identify the type of information included in the content, a term included in the content, an identifier associated with the content, and/or the like. This permits network device 220 to increase privacy and security of personal information or other sensitive information when processing content, as described in more detail elsewhere herein.

In some implementations, network device 220 may determine cache-ability of the content. In some implementations, network device 220 may determine cache-ability of the content using information included in a response associated with the content. For example, network device 220 may determine cache-ability of the content using a content-control field, an entity tag (e.g., an ETag), a last-modified value, an if-modified-since value, etc., an HTTP header of a response received in association with the content.

In some implementations, when network device 220 determines that the content is cache-able, network device 220 may cache the content for use with one or more other requests. Additionally, or alternatively, network device 220 may stream the cached content to client device 210 (e.g., based on parameters that client device 210 and server device 240 negotiate). In this way, network device 220 conserves network resources by reducing an amount of content provided from server device 240 to network device 220. Furthermore, in this way, network device 220 conserves processing resources by reducing an amount of requests that network device 220 has to provide to server device 240 and/or that server device 240 has to receive. Furthermore, this permits quick analysis of content via pre-fetching and caching of content, relative to waiting for a content response from server device 240 at the time of a request from client device 210.

In some implementations, network device 220 may receive the request for the content prior to receiving the content. For example, network device 220 may receive the request by being an intermediary device between client device 210 and server device 240. In some implementations, network device 220 may process the request to identify information included in the request. For example, network device 220 may process the request to identify content being requested, a range of content being requested, a source of the request, and/or the like.

In some implementations, network device 220 may apply a rule based on the request. For example, network device 220 may apply a rule based on information included in the request. In some implementations, network device 220 may perform an action when applying the rule. For example, network device 220 may block the request, may provide the request to server device 240, may record the request (or information included in the request), may process the request (e.g., using cached content and without communicating with server device 240), and/or the like.

In some implementations, network device 220 may normalize information included in the request (e.g., prior to providing the request to server device 240). In some implementations, network device 220 may normalize information identifying content being requested (e.g., the range of the content being requested). Continuing with previous example, assume that the request is for a range of content from the 999th KB of particular content to the 1,099th KB of the particular content. In this case, network device 220 may normalize the range of content requested so that the range of content requested is from the 1st KB of the particular content to the 2,000th KB of the particular content.

In some implementations, when normalizing a range of content identified by the request, network device 220 may normalize the request based on pre-defined ranges of the content. For example, assume that network device 220 has stored values for pre-defined ranges of content to be used to analyze content received from server device 240. In this case, if network device 220 receives a request for a subset of a pre-defined range of content, network device 220 may normalize the request to include the entire pre-defined range (e.g., to permit easy comparison to a stored value for the pre-defined range).

To provide a specific example, network device 220 may determine that a request includes information identifying a range of content. In some implementations, and continuing with previous example, network device 220 may determine that the range of content includes a portion of a pre-defined range of content. In some implementations, network device 220 may normalize the request for the content by modifying the request to include information identifying the pre-defined range, such that the request for the content is a request for the pre-defined range (e.g., rather than the range of content originally identified by the request). In this way, network device 220 conserves memory resources by reducing a quantity of values that network device 220 has to store, and improves accuracy of analyzing received content by comparing a value for a range of the content to a previously stored value for the same range, thereby increasing security of network 250.

Additionally, or alternatively, network device 220 may normalize information included in the request to pre-fetch content. For example, network device 220 may expand the range of content requested by a threshold amount to pre-fetch content. In this way, network device 220 reduces latency associated with requesting the content, as network device 220 can preemptively process the content to determine a classification of the content (e.g., malware, permitted content, etc.) prior to client device 210 requesting the content.

In some implementations, network device 220 may receive multiple requests for the same content (e.g., from the same client device 210 or different client devices 210). In some implementations, when network device 220 receives multiple requests for the same content, network device 220 may combine the multiple requests into a single request for content. This conserves processing resources of network device 220 and server device 240 by reducing processing of duplicate requests. In addition, this conserves network resources by reducing an amount of duplicate content provided and/or received via network 250.

In this way, network device 220 may receive content from server device 240 based on a request for the content from client device 210.

As further shown in FIG. 4, process 400 may include determining a value for a portion of the content (block 420). For example, network device 220 may determine a value for a portion of the content using a hash function, or another method for determining a value for content. In some implementations, network device 220 may determine the value after receiving the content from server device 240.

In some implementations, the value may include a number, a string, an alphanumeric string, and/or the like. For example, the value may include a hash value, a message digest, a digital fingerprint, a digest, a checksum, and/or the like. In some implementations, the value may uniquely identify the content, the portion of the content, metadata associated with the content, and/or the like.

In some implementations, network device 220 may determine the value using a hash function (e.g., a cryptographic hash function). In some implementations, the hash function may include a function that can be used to map data of an arbitrary size to data of a fixed size. As an example, network device 220 may use one or more secure hash algorithm 2 (SHA-2) cryptographic hash functions, such as SHA 1, SHA-224, or SHA-256. Additionally, or alternatively, and as another example, network device 220 may use message digest 5 (MD5), or any other type of function and/or method for determining a value for the content. In this way, network device 220 may quickly and efficiently determine a value that network device 220 can use to identify a classification for the content.

While the description herein focuses on using a hash function to determine the value, the description is not limited to using a hash function. In some implementations, another type of function may be used to determine the value, such as any function that can repeatedly generate a same, unique output based on the same input.

In some implementations, network device 220 may determine multiple values for various portions of the content. In some implementations, network device 220 may determine the multiple values for various sized portions of the content. For example, network device 220 may determine a first value for a 1 KB portion, a second value for a 10 KB portion that includes the 1 KB portion, a third value for a 100 KB portion that includes the 10 KB portion, and so on. In this way, network device 220 may determine values for increasingly larger portions of the content.

Additionally, or alternatively, network device 220 may determine multiple values for various ranges of the content. For example, network device 220 may determine a first value for a first time range (e.g., when the content is audio or video data), a second value for a second time range that is greater than and includes the first time range, a third value for a third time range that is greater than and includes the second time range, and so on. In some implementations, the various ranges may be pre-defined. For example, for audio and/or video data, network device 220 may determine a first value for the first 10 seconds, determine a second value for the first 20 seconds, determine a third value for the first 30 seconds, and so on based on information identifying the pre-defined ranges as the first 10 seconds, the first 20 seconds, and the first 30 seconds. In this way, network device 220 may determine values for increasingly larger portions of the content.

In some implementations, network device 220 may determine the values in a particular manner. For example, network device 220 may determine the values one-at-a-time. Continuing with the previous example, network device 220 may determine a first value for a first portion of the content and perform a lookup of the first value, as described below. Continuing with the previous example, network device 220 may determine a second value for a second portion (e.g., a larger portion) if the lookup fails to identify a classification result. In this way, network device 220 conserves processing resources of network device 220 by reducing a quantity of values that network device 220 may have to determine. In addition, this permits optimization of identifying a classification of the content by reducing or minimizing an amount of processing of the content needed to identify the classification.

As another example, network device 220 may determine the values without waiting to determine a lookup result. For example, network device 220 may determine a first value for a first portion of the content and a second value for a second portion of the content. Network device 220 may perform a lookup of the first value and/or the second value, as described below. A result of the lookup for the second value may be used to verify a result of the lookup for the first value. In this way, network device 220 improves accuracy of classification by verifying an accuracy of a previous lookup result with a subsequent lookup result.

In this way, network device 220 may determine a value for a portion of content using a hash function.

As further shown in FIG. 4, process 400 may include performing a lookup of the value in a data store to identify a classification of the content (block 430). For example, network device 220 may perform a lookup of the value in a data store, a content store, a data structure, memory resources that store metadata, memory resources that store user specific data, and/or the like. In some implementations, network device 220 may perform the lookup to identify a classification of the content.

In some implementations, the data store may include memory resources used to store values for portions of content and information identifying corresponding classifications for the content. For example, the data store may store a value for a portion of content and information identifying a classification of the content. In some implementations, the data store may be local to network device 220. Conversely, the data store may be remote (e.g., on a remote network device 220). In some implementations, the data store may be distributed across multiple network devices 220. In some implementations, the data store may include information from a prior analysis of content, information input by a network administrator, and/or the like.

In some implementations, a classification may include information that identifies a type of the content. For example, the classification may include information that identifies the type of the content as unpermitted content (e.g., malware, such as adware, a virus, a worm, phishing, etc.) or permitted content (e.g., good-ware, virus-free content, safe content, etc.), and/or the like. In some implementations, a particular classification may be associated with a particular action that network device 220 is to perform. For example, a malware classification may be associated with the action of blocking the content from being provided to client device 210. As another example, a classification of permitted content may be associated with the action of providing the content to client device 210. This permits network device 220 to determine an action to perform based on a classification of the content.

In some implementations, a classification may indicate whether content is potentially harmful (e.g., indicates a likelihood of being harmful). For example, a classification of malware may indicate that the content is potentially harmful or satisfies a threshold likelihood of being harmful. As another example, a classification of good-ware may indicated that the content is likely not harmful, or satisfies a threshold likelihood of not being harmful.

In some implementations, network device 220 may perform the lookup by performing a comparison. For example, network device 220 may perform a comparison of the determined value and values stored in the data store (e.g., to determine whether a result of the comparison indicates a match).

In some implementations, network device 220 may perform a search (e.g., rather than performing a lookup). For example, network device 220 may use a bot, such as a web crawler, to determine whether the value matches a previously determined value stored on another device. This improves identification of the classification by enabling network device 220 to perform a search for a value associated with content to identify the classification.

In this way, network device 220 may perform a lookup of a value determined for a portion of content.

As further shown in FIG. 4, process 400 may include determining whether a result of the lookup indicates a match or a potential match (block 440). For example, network device 220 may determine whether a result of the lookup indicates a match or a potential match.

In some implementations, network device 220 may determine a match when a value determined for the portion of the content matches a value in the data store. In some implementations, network device 220 may determine a potential match when a value determined for metadata of the portion of the content matches a value in the data store. For example, network device 220 may determine a potential match when a value for metadata of a 1 KB portion of the content matches a value in the data store for metadata of a 10 KB portion of the content. Continuing with the previous example, network device 220 may identify a match of values for metadata for a 1 KB portion and a 10 KB portion as a potential match because matching metadata may indicate an increased likelihood that the 1 KB portion and the 10 KB portion are from the same content (e.g., based on having matching metadata). In other words, a potential match may include a match of metadata for portions of content when network device 220 cannot match the portions of content (e.g., due to the portions being of different sizes). Additionally, or alternatively, network device 220 may determine that the result of the lookup fails to indicate a match or a potential match.

In some implementations, when performing a lookup, network device 220 may use a particular data store to determine a match. For example, when using a value for a 1 KB portion of content, network device 220 may use a data store that includes values for various 1 KB portions of content. As another example, when using a value for a 10 KB portion of content, network device 220 may use a data store that includes values for various 10 KB portions of content. This conserves processing resources of network device 220 that would otherwise be used to compare a value for a particular sized portion of content to values of different sized portions of content.

In this way, network device 220 may determine whether a result of the lookup indicates a match or a potential match.

As further shown in FIG. 4, process 400 may include determining whether to provide the value, or the portion of the content corresponding to the value, to a security analysis device to permit the security analysis device to determine the classification of the content (block 450). For example, network device 220 may determine whether to provide the value, or the portion of the content corresponding to the value, to security analysis device 230 to permit security analysis device 230 to determine the classification of the content.

In some implementations, network device 220 may determine whether to provide the value or the portion of content based on a result of performing the lookup. In some implementations, network device 220 may determine not to provide the value or the portion of content when the result of the lookup indicates a match. In some implementations, network device 220 may provide the value or the portion of content when the result of the lookup indicates a potential match or no match.

In some implementations, when network device 220 determines to provide the value, or the portion of content, network device 220 may provide the value prior to providing the portion of content. For example, network device 220 may provide the value to permit the security analysis device to analyze the value to determine the classification of the content prior to providing the portion of content. This conserves network resources when, for example, providing the value consumes fewer network resources relative to providing the portion of content.

In some implementations, when network device 220 determines to provide the value or the portion of content, network device 220 may provide the portion of content when network device 220 receives an indication that security analysis device 230 failed to determine the classification based on the value.

In some implementations, security analysis device 230 may attempt to determine the classification of the content based on the value or the portion of content provided to security analysis device 230 by network device 220. In some implementations, network device 220 may provide the content, and not a portion of the content (e.g., the entire content requested), to security analysis device 230 when security analysis device 230 fails to determine the classification based on the portion of content and the value determined for the portion of content. In this way, network device 220 may optimize identification of a classification of content. In addition, this conserves processing resources of security analysis device 230 and network resources of network 250.

In some implementations, when the content includes personal information or other sensitive information, network device 220 may determine to provide the value for the content (e.g., rather than the content or the portion of the content). This increases privacy and/or security of the content by preventing network device 220 from providing the content to another device when the content includes personal information or other sensitive information.

In this way, network device 220 may determine whether to provide the value, or the portion of content corresponding to the value, to security analysis device 230.

As further shown in FIG. 4, process 400 may include determining the classification of the content based on performing the lookup or based on providing the value, or the portion of content, to the security analysis device (block 460). For example, network device 220 may determine the classification of the content. In some implementations, network device 220 may determine the classification of the content based on performing the lookup and/or providing the value, or the portion of content, to security analysis device 230.

In some implementations, when the result of the lookup indicates a match, network device 220 may determine the classification using corresponding information in the data store that identifies the classification. For example, assume that network device 220 performs a lookup of a value determined for a portion of the content and the lookup results in a match. In this case, network device 220 may determine the classification of the content (e.g., as malware) based on information in the data store that is associated with the value that identifies the classification as malware. This reduces or eliminates a need for network device 220 to use externally stored information to determine the classification, thereby conserving network resources, reducing latency, and/or conserving processing resources of another device.

In some implementations, network device 220 may determine the classification based on information received from security analysis device 230. For example, security analysis device 230 may have processed the value, the portion of content, or the entire content, to determine the classification and may have provided information identifying the classification to network device 220. In this way, network device 220 may use another device to determine the classification, thereby improving determination of the classification because the other device may perform a more robust analysis.

In this way, network device 220 may determine a classification of content based on performing a lookup or based on providing content, a portion of the content, or a value determined for the content, to security analysis device 230.

As further shown in FIG. 4, process 400 may include performing an action based on the classification of the content after determining the classification of the content (block 470). For example, network device 220 may perform an action based on the classification of the content. In some implementations, network device 220 may perform the action after determining the classification of the content.

In some implementations, network device 220 may allow the content by providing the content to client device 210. Additionally, or alternatively, network device 220 may store the value, the content, and/or information indicating the classification of the content in the data store. For example, when network device 220 has to provide the value, or the corresponding portion, to security analysis device 230, network device 220 may store the value and/or the information identifying the classification (e.g., as determined by security analysis device 230). This conserves processing resources of network device 220 and security analysis device 230, and/or conserves network resources, by reducing or eliminating a need for network device 220 to provide information associated with the same content to security analysis device 230 multiple times. Additionally, or alternatively, network device 220 may block the content by preventing the content from being provided to client device 210, by dropping a packet associated with the content, and/or the like.

Additionally, or alternatively, network device 220 may record information associated with the content (e.g., a source of the request, a source of the content, a classification of the content, etc.). In some implementations, network device 220 may generate a report that includes the information and may provide the report for display (e.g., via a display of client device 210). Additionally, or alternatively, network device 220 may trigger an alert based on the classification, such as when the classification of the content is malware.

Additionally, or alternatively, network device 220 may send a message (e.g. an email, a short message services (SMS) message, etc.) to client device 210 with information indicating the classification. Additionally, or alternatively, network device 220 may provide information related to the content or the classification of the content for display (e.g., via a display of client device 210). Additionally, or alternatively, a first network device 220 may provide information to a second network device 220, such that the second network device 220 has information related to a result of an analysis of content that the first network device 220 performed, thereby improving a future analysis by the second network device 220.

Additionally, or alternatively, network device may record a metric. For example, network device 220 may record a metric related to an amount of content processed or provided to security analysis device 230, a quantity of values processed or provided to security analysis device 230, a CPU utilization of network device 220 and/or security analysis device 230, a memory resource utilization of network device 220 and/or security analysis device 230, and/or information identifying timer events to provide or retry providing content and/or a value associated with the content to security analysis device 230. In some implementations, network device 220 may provide information identifying the metric (e.g., for display or in a report). Additionally, or alternatively, network device 220 may determine whether to provide the content and/or a value to security analysis device 230 or client device 210 based on the metric (e.g., when a metric satisfies a threshold).

In this way, network device 220 may perform an action based on the classification of the content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
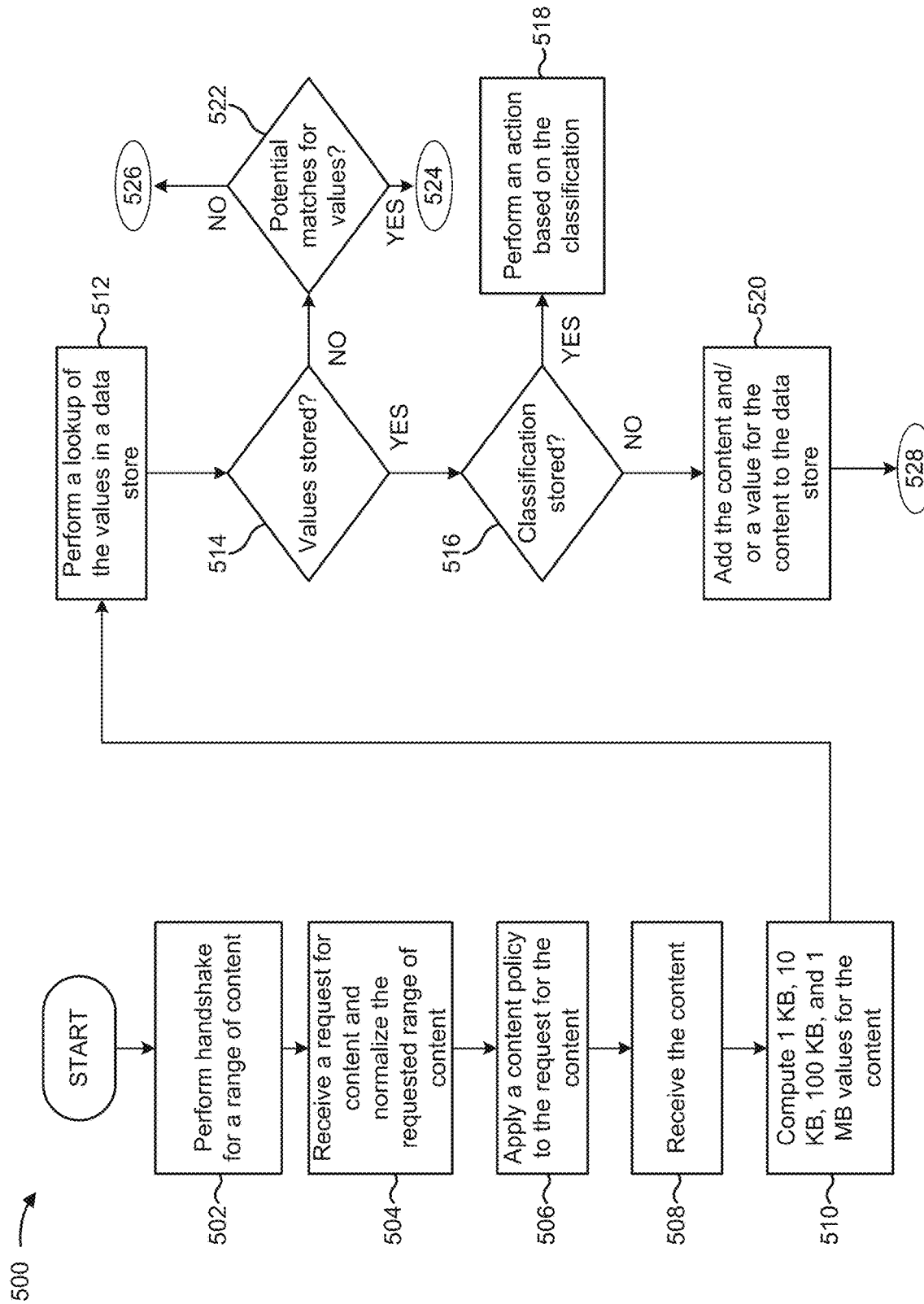
FIGS. 5A and 5B are diagrams of an example implementation relating to the example process shown in FIG. 4.
Figure 5B:
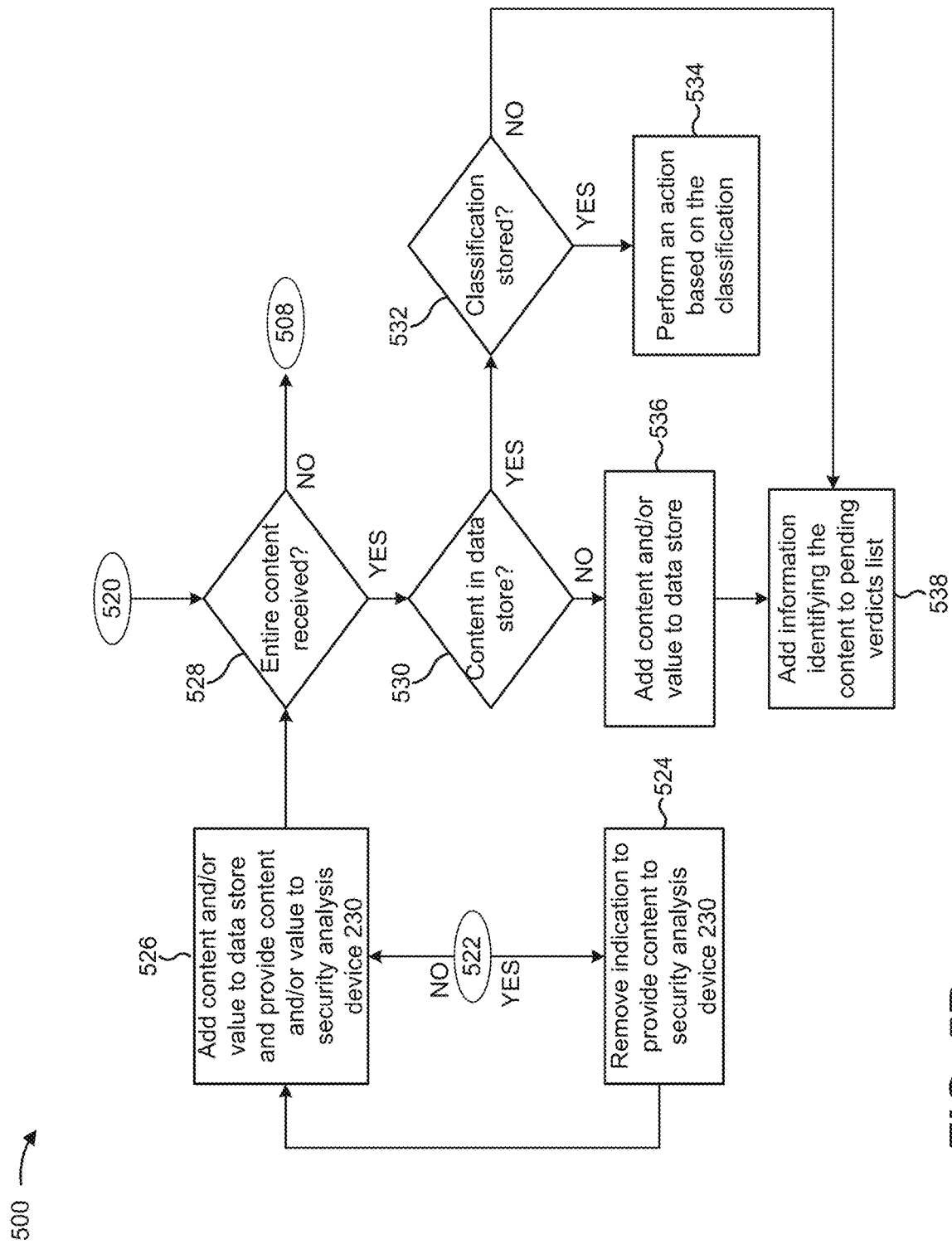

FIGS. 5A and 5B are diagrams of an example implementation 500 relating to example process 400 shown in FIG. 4. FIGS. 5A and 5B show an example implementation of optimizing security analysis on a network device.

As shown in FIG. 5A, and by reference number 502, client device 210 and server device 240 may perform a handshake for a range of content. For example, client device 210 and server device 240 may perform a handshake to determine a byte range or a time range of content. In some implementations, client device 210 and server device 240 may perform the handshake via network device 220. For example, network device 220 and server device 240 may perform the handshake for a range of content.

As shown by reference number 504, network device 220 may receive a request for content (e.g., destined for server device 240) and may normalize the request range of content. As shown by reference number 506, network device 220 may apply a content policy to the request for the content. For example, network device 220 may block the request or permit the request based on information included in the request. As shown by reference number 508, network device 220 may receive the content. For example, network device 220 may receive the content from server device 240 based on providing the request to server device 240. As shown by reference number 510, network device 220 may compute 1 KB, 10 KB, 100 KB, and 1 MB values for the content. For example, network device 220 may compute the values in a manner similar to that described elsewhere herein. In some implementations, network device 220 may compute the values sequentially or may compute at least some of the values in parallel.

As shown by reference number 512, network device 220 may perform a lookup of the values in a data store. For example, the data store may be locally stored, remotely stored, or distributed, and may include previously determined values for portions of content. As shown by reference number 514, network device 220 may determine whether the data store stores the values based on performing the lookup.

If network device 220 determines that the data store stores the values (reference number 514-YES), as shown by reference number 516, network device 220 may determine whether the data store stores information identifying a classification (e.g., a classification of the content). As shown by reference number 518, if network device 220 determines that the data store stores information identifying a classification (reference number 516-YES), network device 220 may perform an action based on the classification. For example, network device 220 may provide the content, block the content, or generate a report that includes information identifying the classification. As shown by reference number 520, if network device 220 determines that the data store does not store a classification for the content, network device 220 may add the content and/or a value for the content to the data store (e.g., for use with future analyses).

As shown by reference number 522, if network device 220 determines that the data store does not store the values (reference number 514-NO), then network device 220 may determine whether there are potential matches for the values. For example, network device 220 may determine whether there are potential matches for the values in a manner similar to that described elsewhere herein.

As shown in FIG. 5B, and by reference number 524, if network device 220 determines that the data store stores potential matches for the values (reference number 522-YES), network device 220 may remove an indication to provide the content to security analysis device 230 and proceed to reference number 526. In other words, network device 220 may determine not to provide the content to security analysis device 230. As shown by reference number 526, if network device 220 determines that the data store does not include potential matches for the values (reference number 522-NO), network device 220 may add the content and/or the value determined for the content to a data store, may provide the content to security analysis device 230 (e.g., for further analysis), and may proceed to reference number 528.

As shown by reference number 528, network device 220 may determine whether the entire content was received (e.g., the entire requested content). If network device 220 determines that the entire content was not received, network device 220 may continue to receive the content, as shown by reference number 508 in FIG. 5A, and may proceed as described above. As shown by reference number 530, if network device 220 determines that entire content was received (reference number 528-YES), network device 220 may determine whether network device 220 has stored the content in the data store.

As shown by reference number 532, if network device 220 determines that the content is stored in the data store, network device 220 may determine whether the data store stores information identifying a classification of the content. As shown by reference number 534, if network device 220 determines that the data store stores information identifying a classification of the content (reference number 532-YES), network device 220 may perform an action based on the classification identified by the information and may proceed to reference number 538. For example, network device 220 may provide the content to client device 210, block the content, or generate a report related to the content.

As shown by reference number 536, if network device 220 determines that the data store does not store the content, network device 220 may add the content and/or a value for the content to the data store (e.g., to permit future analyses of the content). As shown by reference number 538, network device 220 may add information identifying the content to a pending verdicts list. For example, the pending verdicts list may identify content for which network device 220 has not determined a classification and/or for which network device 220 may be waiting to receive information identifying a classification of the content from security analysis device 230.

As indicated above, FIGS. 5A and 5B are provided merely as an example. Other examples are possible and may differ from what was described with regard to FIGS. 5A and 5B.

Figure 6:
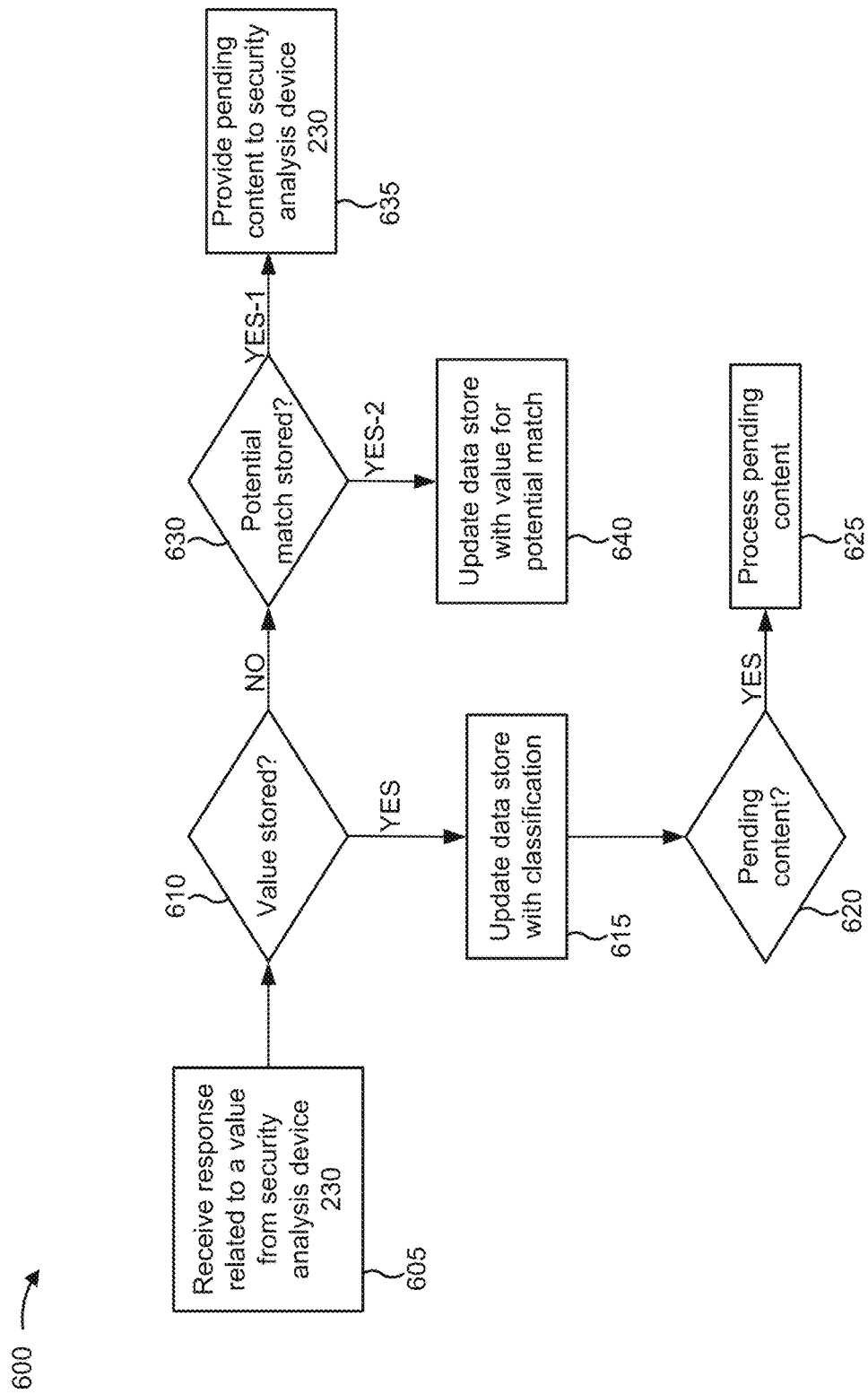
FIG. 6 is a diagram of an example implementation relating to the example process shown in FIG. 4.

FIG. 6 is a diagram of an example implementation 600 relating to the example process 400 shown in FIG. 4. FIG. 6 shows an example of receiving a response from security analysis device 230 regarding analysis of a value (e.g., when network device 220 does not have the value stored in a data store).

As shown in FIG. 6, and by reference number 605, network device 220 may receive a response related to a value from security analysis device 230. For example, the response may include information identifying a result of analyzing a value, for a portion of content, that network device 220 provided to security analysis device 230. As shown by reference number 610, network device 220 may determine whether security analysis device 230 has the value stored in a data store of security analysis device 230 (e.g., based on information included in the response).

As shown by reference number 615, if network device 220 determines that security analysis device 230 has the value stored in a data store associated with security analysis device 230 (reference number 610-YES), network device 220 may update a data store associated with network device 220 with information identifying a classification of the content (e.g., as determined from information included in the response from security analysis device 230). As shown by reference number 620, network device 220 may determine whether the content for which the value was determined is pending (e.g., has not been provided to client device 210, is identified by a pending content list, etc.). As shown by reference number 625, if network device 220 determines that the content is pending (reference number 620-YES), network device 220 may process the content based on the information identifying the classification received from security analysis device 230. For example, network device 220 may provide the content to client device 210, quarantine the content, drop the content, and/or the like.

As shown by reference number 630, if network device 220 determines that security analysis device 230 has not stored the value (reference number 610-NO), network device 220 may determine whether security analysis device 230 has stored a potential match. If network device 220 determines that security analysis device 230 has stored a potential match for the value, network device 220 may perform one or more actions. For example, and as shown by reference number 635 (reference number 630-YES-1), network device 220 may provide pending content to security analysis device 230 for analysis. As another example, and as shown by reference number 640 (reference number 630-YES-2), network device 220 may update the data store with a value for the potential match (e.g., a value for metadata of the content).

In this way, network device 220 may receive a response from security analysis device 230 based on providing a value to security analysis device 230 for analysis.

As indicated above, FIG. 6 is provided merely as an example. Other examples are possible and may differ from what was described with regard to FIG. 6.

Figure 7:
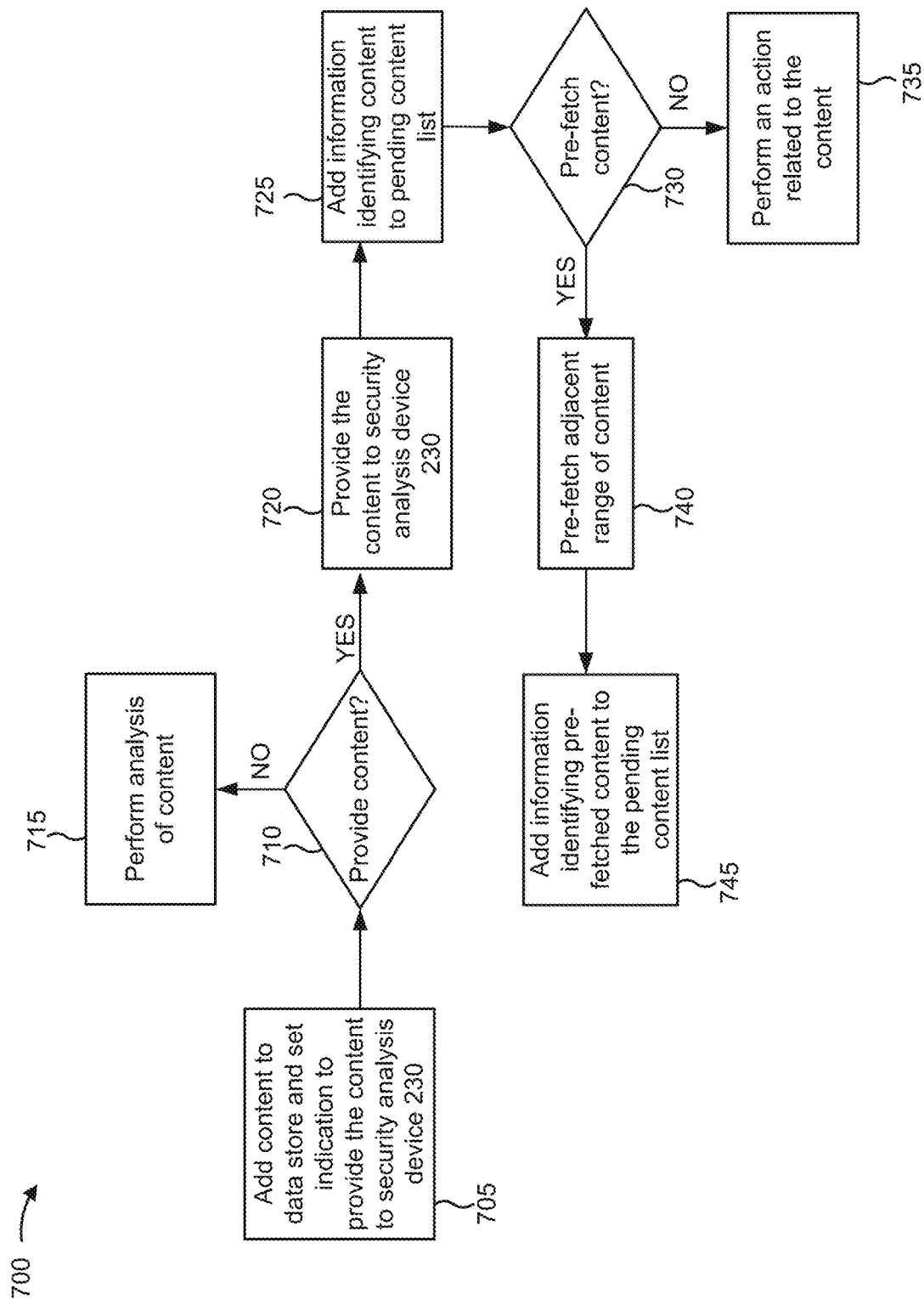
FIG. 7 is a diagram of an example implementation relating to the example process shown in FIG. 4.

FIG. 7 is a diagram of an example implementation 700 relating to the example, process 400 shown in FIG. 4. FIG. 7 shows an example of pre-fetching content.

As shown in FIG. 7, and by reference number 705, network device 220 may add content to the data store and may set an indication (e.g., a flag) to provide the content to security analysis device 230. As shown by reference number 710, network device 220 may determine whether to provide the content. For example, network device 220 may determine whether to provide the content to security analysis device 230 in a manner similar to that described above.

As shown by reference number 715, if network device 220 determines not to provide the content to security analysis device 230 (reference number 710-NO), network device 220 may perform an analysis of the content. For example, network device 220 may determine a value for a portion of the content and may perform a lookup using the value.

As shown by reference number 720, if network device 220 determines to provide the content to security analysis device 230 (reference number 710-YES), network device 220 may provide the content to security analysis device 230 based on setting the indication. For example, network device 220 may provide the content to security analysis device 230 to permit security analysis device 230 to analyze the content (e.g., to determine a classification of the content). As shown by reference number 725, network device 220 may add information identifying the content to a pending content list and/or add the content to a pending content data store (e.g., while waiting for a result of the analysis from security analysis device 230).

As shown by reference number 730, network device 220 may determine whether to pre-fetch content from server device 240. For example, network device 220 may determine whether to pre-fetch content based on the type of the content, the content range of the requested content, and/or the like. As shown by reference number 735, if network device 220 determines not to pre-fetch content (reference number 730-NO), then network device 220 may perform an action related to the content (e.g., content previously received). For example, network device 220 may provide the content to client device 210 without pre-fetching additional content.

As shown by reference number 740, if network device 220 determines to pre-fetch the content (reference number 730-YES), network device 220 may pre-fetch an adjacent range of content to the originally requested range of the content. As shown by reference number 745, network device 220 may add information identifying the pre-fetched content to a pending content list and/or add the pre-fetched content to a pending content data store (e.g., while network device 220 waits for security analysis device 230 to analyze the content).

In some implementations, after pre-fetching content, network device 220 may perform a lookup of the content in a local data store to determine a match for the content (e.g., to permit classification of the content). In some implementations, if network device 220 fails to determine a match for the content, then network device 220 may add a value for the content to the local data store and may provide the content to security analysis device 230 for analysis.

In this way, network device 220 may pre-fetch content associated with requested content.

As indicated above, FIG. 7 is provided merely as an example. Other examples are possible and may differ from what was described with regard to FIG. 7.

Figure 8:
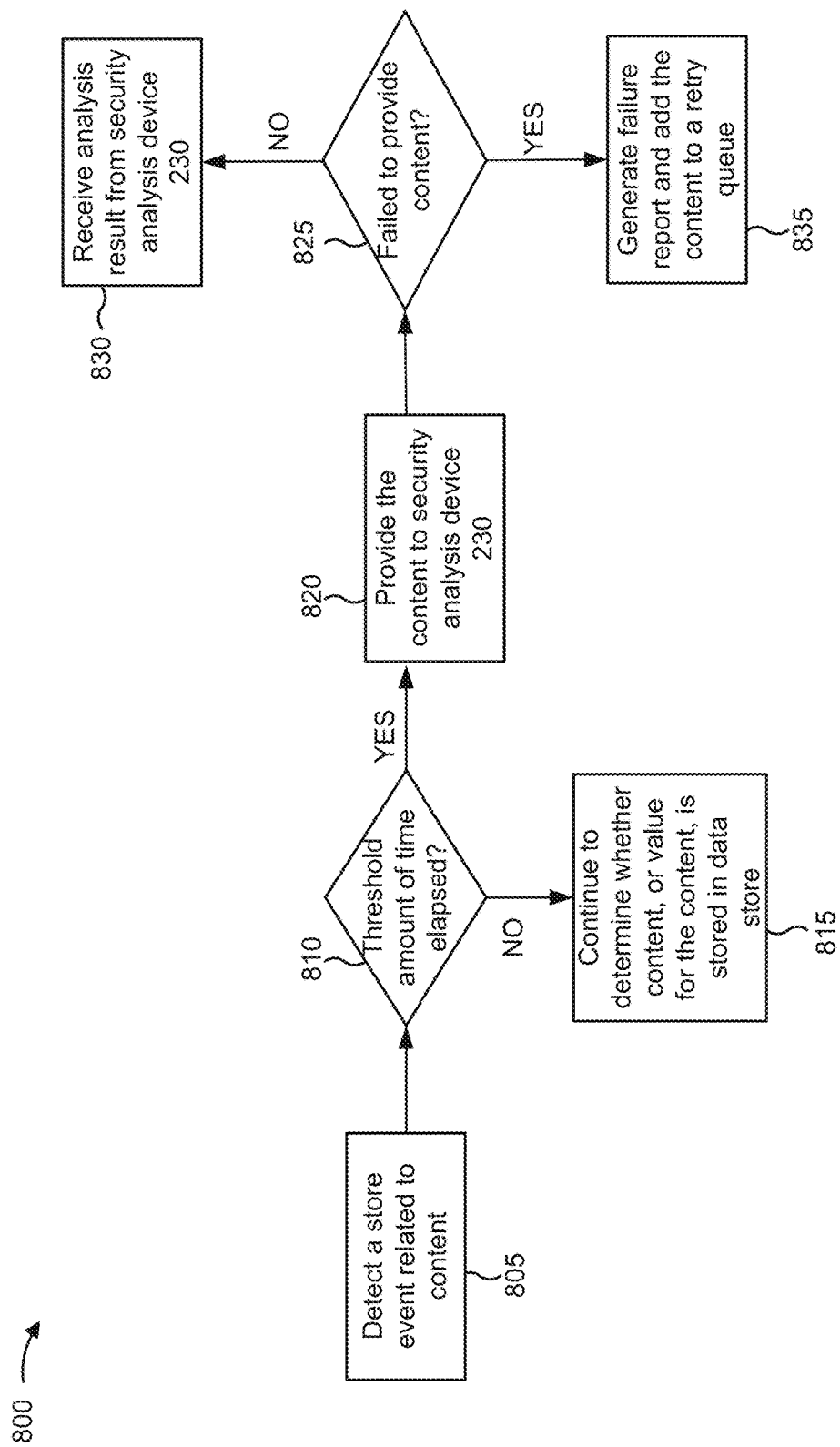
FIG. 8 is a diagram of an example implementation relating to the example process shown in FIG. 4.

FIG. 8 is a diagram of an example implementation 800 relating to the example process 400 shown in FIG. 4. FIG. 8 shows an example of determining when to provide content to security analysis device 230 for analysis.

As shown in FIG. 8, and by reference number 805, network device 220 may detect a store event related to content (e.g., receiving the content, pre-fetching of content, receiving new content, etc.). In some implementations, network device 220 may determine whether a data store associated with network device 220 includes the content, or a value for the content, after detecting the store event. As shown by reference number 810, network device 220 may determine whether a threshold amount of time has elapsed (e.g., a timeout) without finding the content, or a value for the content, in the data store. As shown by reference number 815, if network device 220 determines that a threshold amount of time has not elapsed without finding the content, or a value for the content (reference number 810-NO), in the data store, then network device 220 may continue to determine whether the content, or a value for the content, is stored in the data store.

As shown by reference number 820, if network device 220 determines that a threshold amount of time has elapsed without finding the content, or a value for the content, in the data store (reference number 810-YES), network device 220 may provide the content, or a value for the content, to security analysis device 230 for analysis. As shown by reference number 825, network device 220 may determine whether there was a failure with respect to providing the content, or a value for the content, to security analysis device 230. For example, network device 220 may fail to provide the content due to an error of network device 220, congestion on network 250, and/or the like. As shown by reference number 830, if network device 220 determines that there was not a failure with respect to providing the content, or a value for the content (reference number 825-NO), then network device 220 may receive, or wait to receive, an analysis result from security analysis device 230. For example, network device 220 may receive, or wait to receive, a result of security analysis device 230 analyzing the content. As shown by reference number 835, if network device 220 determines there was a failure with respect to providing the content (reference number 825-YES), or a value for the content, network device 220 may generate a report indicating that there was a failure and may add the content, or a value for the content, to a retry queue (e.g., to cause network device 220 to re-try providing the content to security analysis device 230).

In this way, network device 220 may determine when to provide content to security analysis device 230.

As indicated above, FIG. 8 is provided merely as an example. Other examples are possible and may differ from what was described with regard to FIG. 8.

FIG. 9 is a diagram of an example implementation 900 relating to the example process 400 shown in FIG. 4. FIG. 9 shows an example of a data store that network device 220 may use.

As shown in FIG. 9, example implementation 900 may include one or more network devices (e.g., network device 220-0 through network device 220-N) and one or more data stores (e.g., data store 0 through data store N). As shown by reference number 910, one or more logically or physically distributed network devices 220 (e.g., network device 220-0 through 220-N) may store the one or more data stores. In some implementations, the network devices 220 may be connected such that a first network device 220 (e.g., network device 220-0) can access information in a data store of a second network device 220 (e.g., network device 220-1).

In some implementations, the data store may store an object, such as content (e.g., full or partial content), a value of the content (or metadata associated with the content), and/or the like. In some implementations, network device 220 may use a timer to record an amount of time the object has been stored in the data store, an amount of time from the last lookup of the object, and/or the like. In some implementations, after a threshold amount of time has elapsed, network device 220 may remove the object from the data store (e.g., may remove a less frequently used object relative to other objects). This conserves memory resources related to the data store and/or permits faster lookup of objects by reducing a quantity of objects in the data store, which conserves processing resources of network device 220.

In this way, network device 220 may use a data store stored by another network device 220.

As indicated above, FIG. 9 is provided merely as an example. Other examples are possible and may differ from what was described with regard to FIG. 9. For example, a single network device 220 may store data stores 0 through N, a device other than network device 220 may store one or more of data stores 0 through N, and/or the like.

Implementations described herein enable a network device to determine a classification of content in association with performing security functions by determining a value (e.g., a digest) for the content and using the value to determine the classification. In addition, implementations described herein enable optimization of use of multiple values for various sized portions of content to reduce a quantity of values determined for the content. In this way, the network device reduces an amount of content that needs to be processed by the network device to determine a classification of the content, thereby conserving processing resources and reducing latency. Furthermore, in this way, the network device reduces an amount of information that may have to be sent to a security analysis device for processing (e.g., when the network device fails to determine the classification of the content), thereby conserving network resources and improving network performance.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Although implementations are described herein with reference to content, the implementations are not limited to content or to content-related protocols. For example, the implementations may apply to hypertext transfer protocol (HTTP), HTTP secure (HTTPS), simple mail transfer protocol (SMTP), Internet message access protocol (IMAP), post office protocol (POP), ActiveSync, Gmail push, and/or any other type of protocol. In addition, implementations may apply to the secure socket layer (SSL) and/or transport layer security (TLS) variations of the previously described protocols.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a first device, a first value for a first portion of content, the first value uniquely identifying the first portion of content;
   performing, by the first device, a first lookup of the first value to identify a classification of the content;
   determining, by the first device, that the first lookup failed to identify a classification result;
   determining, by the first device and based on determining that the first lookup failed to identify the classification result and using a particular hash function, a second value for a second portion of the content,
      the first device being configured to avoid determining the second value for the second portion if the first device successfully determines the classification of the content based on the first value,
      the second portion of the content being larger than the first portion of the content, and
      the second value uniquely identifying the second portion of the content;
   performing, by the first device, a second lookup of the second value to identify the classification of the content;
   selectively:
      determining, by the first device and based on the second lookup not indicating a match, the classification of the content by providing the second value or the second portion of the content to a second device; or
      determining, by the first device and based on the second lookup indicating a match, the classification of the content;
   providing the second portion of the content to the second device;
   adding information, identifying the second portion of the content, to a pending content list or a pending data store based on providing the second portion of the content to the second device;
   receiving an analysis of the second portion of the content after adding the information, identifying the second portion of the content, to the pending content list or the pending data store; and
   performing, by the first device, one or more actions with respect to the content based on the classification of the content.

2. The method of claim 1, wherein determining the first value comprises:
   determining the first value using a hash function.

3. The method of claim 1, wherein determining the classification of the content by providing the second value or the second portion of the content to the second device comprises:
   providing the second portion of the content to the second device based on the second device failing to identify the classification of the content using the second value.

4. The method of claim 1, wherein performing the one or more actions based on the classification of the content comprises:
   preventing the content from being provided to a third device based on the content being classified as malware; or
   permitting the content to be provided to the third device based on the content not being classified as malware.

5. The method of claim 1, wherein performing the first lookup comprises:
   performing the first lookup in a data store;
   wherein performing the second lookup comprises:
      performing the second lookup in the data store; and
   wherein the method further comprises:
      updating the data store with information identifying the classification of the content based on determining the classification of the content by providing the second value or the second portion of the content to the second device.

6. The method of claim 1, further comprising:
   determining, based on performing the second lookup, whether a threshold amount of time has elapsed without finding a match; and
   wherein determining the classification of the content by providing the second value or the second portion of the content to the second device comprises:
      determining, based on determining that the threshold amount of time has elapsed without finding a match, the classification of the content by providing the second value or the second portion of the content to the second device.

7. The method of claim 1, wherein the second device comprises a security analysis device.

8. A first device, comprising:
   one or more memories; and
   one or more processors communicatively coupled to the one or more memories, configured to:
      determine a first value for a first portion of content, the first value uniquely identifying the first portion of content;
      perform a first lookup of the first value to identify a classification of the content;
      determine that the first lookup failed to identify a classification result;
      determine, based on determining that the first lookup failed to identify the classification result and using a particular hash function, a second value for a second portion of the content,
         the first device being configured to avoid determining the second value for the second portion if the first device successfully determines the classification of the content based on the first value,
         the second portion of the content being larger than the first portion of the content, and
         the second value uniquely identifying the second portion of the content;
      perform a second lookup of the second value to identify the classification of the content;
      selectively:
         determine, based on the second lookup not indicating a match, the classification of the content by providing the second value or the second portion of the content to a second device; or determine, based on the second lookup indicating a match, the classification of the content;
provide the second portion of the content to the second device;
add information, identifying the second portion of the content, to a pending content list or a pending data store based on providing the second portion of the content to the second device;
receive an analysis of the second portion of the content after adding the information, identifying the second portion of the content, to the pending content list or the pending data store; and
perform one or more actions with respect to the content based on the classification of the content.

9. The first device of claim 8, wherein the one or more processors, when determining the first value, are configured to:
determine the first value using a hash function.

10. The first device of claim 8, wherein the one or more processors, when determining the classification of the content by providing the second value or the second portion of the content to the second device, are configured to:
provide the second portion of the content to the second device based on the second device failing to identify the classification of the content using the second value.

11. The first device of claim 8, wherein the one or more processors, when performing the one or more actions based on the classification of the content, are configured to:
prevent the content from being provided to a third device based on the content being classified as malware; or
permit the content to be provided to the third device based on the content not being classified as malware.

12. The first device of claim 8, wherein the one or more processors, when performing the first lookup, are configured to:
perform the first lookup in a data store;
wherein the one or more processors, when performing the second lookup, are configured to:
perform the second lookup in the data store; and
wherein the one or more processors are further configured to:
update the data store with information identifying the classification of the content based on determining the classification of the content by providing the second value or the second portion of the content to the second device.

13. The first device of claim 8, wherein the one or more processors are further configured to:
determine, based on performing the second lookup, whether a threshold amount of time has elapsed without finding a match; and
wherein the one or more processors, when determining the classification of the content by providing the second value or the second portion of the content to the second device, are configured to:
determine, based on determining that the threshold amount of time has elapsed without finding a match, the classification of the content by providing the second value or the second portion of the content to the second device.

14. The first device of claim 8, wherein the first portion of the content is associated with a first time range and wherein the second portion of the content is associated with a second time range,
wherein the second time range is greater than the first time range.

15. A non-transitory computer-readable medium storing instructions, the instructions comprising:
one or more instructions that, when executed by one or more processors of a first device, cause the one or more processors to:
determine a first value for a first portion of content, the first value uniquely identifying the first portion of content;
perform a first lookup of the first value to identify a classification of the content;
determine that the first lookup failed to identify a classification result;
determine, based on determining that the first lookup failed to identify the classification result and using a particular hash function, a second value for a second portion of the content,
the first device being configured to avoid determining the second value for the second portion if the first device successfully determines the classification of the content based on the first value,
the second portion of the content being larger than the first portion of the content, and
the second value uniquely identifying the second portion of the content;
perform a second lookup of the second value to identify the classification of the content;
selectively:
determine, based on the second lookup not indicating a match, the classification of the content by providing the second value or the second portion of the content to a second device; or
determine, based on the second lookup indicating a match, the classification of
the content;
provide the second portion of the content to the second device;
add information, identifying the second portion of the content, to a pending content list or a pending data store based on providing the second portion of the content to the second device;
receive an analysis of the second portion of the content after adding the information, identifying the second portion of the content, to the pending content list or the pending data store; and
perform one or more actions with respect to the content based on the classification of the content.

16. The non-transitory computer-readable medium of claim 15, wherein the one or more instructions, that cause the one or more processors to determine the first value, cause the one or more processors to:
determine the first value using a hash function.

17. The non-transitory computer-readable medium of claim 15, wherein the one or more instructions, that cause the one or more processors to determine the classification of the content by providing the second value or the second portion of the content to the second device, cause the one or more processors to:
provide the second portion of the content to the second device based on the second device failing to identify the classification of the content using the second value.

18. The non-transitory computer-readable medium of claim 15, wherein the one or more instructions, that cause the one or more processors to perform the one or more actions based on the classification of the content, cause the one or more processors to:
prevent the content from being provided to a third device based on the content being classified as malware; or permit the content to be provided to the third device based on the content not being classified as malware.

19. The non-transitory computer-readable medium of claim 15, wherein the one or more instructions, that cause the one or more processors to perform the first lookup, cause the one or more processors to:
   perform the first lookup in a data store;
   wherein the one or more instructions, that cause the one or more processors to perform the second lookup, cause the one or more processors to:
      perform the second lookup in the data store; and
   wherein the one or more instructions, when executed by the one or more processors, further cause the one or more processors to:
      update the data store with information identifying the classification of the content based on determining the classification of the content by providing the second value or the second portion of the content to the second device.

20. The non-transitory computer-readable medium of claim 15, wherein a size associated with the second portion of the content is selected based on a pre-defined range.

\* \* \* \* \*